UNITED STATES PATENT OFFICE.

GEORG MUTH, OF BUTZBACH, GERMANY, ASSIGNOR TO THE FIRM OF DR. GRAF & COMP., OF NEUBABELSBERG, NEAR BERLIN, GERMANY.

PAPER-SIZE AND THE PROCESS OF MAKING SAME.

1,194,866. Specification of Letters Patent. Patented Aug. 15, 1916.

No Drawing. Application filed January 25, 1916. Serial No. 74,092.

*To all whom it may concern:*

Be it known that I, GEORG MUTH, subject of the Emperor of Germany, residing at Butzbach, in the Grand Duchy of Hesse, German Empire, have invented certain new and useful Improvements in Paper-Size and the Process of Making Same, of which the following is a specification.

My invention relates to an improved paper size, and to the process of producing same.

It is well known, that resinous substances, like asphaltum, bitumen, pitch and similar matter can be converted into an emulsion by means of saponifying components, like resins, fatty acids and the like. These emulsion products are totally unfit for paper manufacture because of their deep black color and their lack of uniformity. In fact, they contain considerable portions of unsaponifiable substances, which strongly interfere with the formation of uniform emulsions. It is also known, that resinous substances can be artificially obtained by distillation of coal tar. The tar distilleries were not interested in the preparation of those substances because they could not be freely sold on account of their insignificant applicability in the arts. Especially the employment of those artificial resins, like the resins of cumaron and indene which are obtained by the polymerization of cumaron ($C_8H_6O$) and indene ($C_9H_8$), in the manufacture of paper for sizing purposes was altogether unknown and considered impossible owing to their inability of being directly saponified by means of alkalies. Such is, however, the primary condition of their applicability, because the sizing of paper makes the most intimate division of the resinous parts in water requisite and compulsory.

I have now devised a process, by which the emulsification of the artificial resins mentioned and obtained from coal tar can be effected. This result is attained by means of saponifiable resins, like colophonium or similar resins.

The following method will give by way of example an illustration of the steps to carry out the present invention: 100 parts of saponifiable resin are melted together with about 500 to 1000 parts of, say cumaron-resin. The mass is kept in molten condition until frothing has ceased. The mixture is then boiled with just sufficient alkali or ammonia or alkali metal silicate solution, until the whole mass forms a uniform emulsion. The boiling can be performed in open vessels or in closed boilers under pressure.

The conversion of the cumaron-resin or indene resin into an emulsion can also be effected by means of all kinds of saponifiable fats or oils of animal, vegetable or mineral origin, in the manner previously described for saponifiable resins. The fats and oils are melted with an amount of cumaron-resin or indene resin equal to several times their weight and boiled with an alkali or ammonia or alkali metal silicate solution, until the mass presents a uniform appearance and forms a soap, as is well known in the manufacture of soaps. It is clear, that the amount of alkali used will vary according to the nature of the soaps and whether hard or soft soaps are wanted.

The application of cumaron-resin or indene resin in an emulgated state is of special value for the sizing of paper, not only as regards its economic advantages but also because the degree of purity of the artificial resins is greater than that of colophonium or other natural resins. The resinous soap is very soluble in water, so much so that it need not be dissolved, but can be directly introduced into the Hollander mill. It will also be evident, that the resinous soaps obtained from cumaron or indene resin may be employed in the manufacture of medicinal, cosmetic and similar preparations.

What I wish to claim is:—

1. As an article of manufacture, a paper size containing artificial resin obtained from coal tar.

2. As an article of manufacture, a paper size containing cumaron resin.

3. The herein described process of manufacturing a paper size, which consists in melting artificial resin obtained from coal tar and natural resin and maintaining the mixture in a molten condition until frothing thereof has ceased, and thereupon boiling the mass with alkalies until a uniform emulsion is formed.

4. The herein described process of manufacturing a paper size, which consists in melting artificial resin obtained from coal tar with a saponifiable fatty substance, and thereupon boiling the mass with alkalies.

5. The herein described process of manufacturing a paper size, which consists in melting cumaron resin with a saponifiable fatty substance, and thereupon boiling the mass with alkalies.

In testimony whereof I affix my signature.

GEORG MUTH.

Witnesses:
HENRY HASPER,
ARTHUR SCHROEDER.